(12) United States Patent
Shi et al.

(10) Patent No.: US 12,396,014 B2
(45) Date of Patent: Aug. 19, 2025

(54) THRESHOLD VALUE, RESOURCE DETERMINATION METHOD, APPARATUS, NETWORK DEVICE, AND STORAGE MEDIUM

(71) Applicant: ZTE CORPORATION, Shenzhen (CN)

(72) Inventors: Jing Shi, Shenzhen (CN); Peng Hao, Shenzhen (CN); Xianghui Han, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 161 days.

(21) Appl. No.: 17/607,810

(22) PCT Filed: Apr. 29, 2020

(86) PCT No.: PCT/CN2020/087736
§ 371 (c)(1),
(2) Date: Oct. 29, 2021

(87) PCT Pub. No.: WO2020/221287
PCT Pub. Date: Nov. 5, 2020

(65) Prior Publication Data
US 2022/0201691 A1 Jun. 23, 2022

(30) Foreign Application Priority Data
Apr. 30, 2019 (CN) .......................... 201910364299.1

(51) Int. Cl.
*H04W 72/53* (2023.01)
*H04L 25/02* (2006.01)
*H04W 72/0446* (2023.01)

(52) U.S. Cl.
CPC ......... *H04W 72/53* (2023.01); *H04L 25/0238* (2013.01); *H04W 72/0446* (2013.01)

(58) Field of Classification Search
None
See application file for complete search history.

(56) References Cited

U.S. PATENT DOCUMENTS 6,940,979 B1 * 9/2005 Bobbitt ................. H04L 9/006
713/175
2002/0087495 A1 * 7/2002 Wang ..................... G06F 18/00
706/45

(Continued)

FOREIGN PATENT DOCUMENTS

CN 101489255 A 7/2009
CN 109673056 A 4/2019

(Continued)

OTHER PUBLICATIONS

Huawei, "Summary of 7.2.6.1 PDCCH enhancements", 3GPP TSG RAN WG1 Meeting #96bis, R1-1905876, Apr. 12, 2019 (Year: 2019).*

(Continued)

*Primary Examiner* — Clemence S Han
(74) *Attorney, Agent, or Firm* — Morgan, Lewis & Bockius LLP

(57) ABSTRACT

Provided are a threshold value determination method and apparatus, a resource determination method and apparatus, a network device and a storage medium. The threshold value determination method includes: a first threshold value is determined according to a preset rule, where the first threshold value is a threshold value of each span in a span pattern. The resource determination method includes: a resource that should be reserved or dropped is determined by utilizing a threshold value of a span; where the resource includes a candidate set, or all candidate sets within a search space, or all candidate sets of the search space within a current span, or candidate sets of all search spaces within the span.

15 Claims, 5 Drawing Sheets

Determine a second threshold value, where the second threshold value is a threshold value corresponding to each combination in the combination set reported by the user equipment — S21

Determine the first threshold value according to the second threshold value — S22

(56) References Cited

U.S. PATENT DOCUMENTS

| | | | | |
|---|---|---|---|---|
| 2008/0166142 | A1* | 7/2008 | Kreiter | G03G 15/0849 |
| | | | | 399/53 |
| 2018/0150557 | A1* | 5/2018 | Lev | G06F 16/3344 |
| 2019/0223164 | A1* | 7/2019 | He | H04L 25/0204 |
| 2019/0268206 | A1* | 8/2019 | Yang | H04L 5/0051 |
| 2019/0313442 | A1* | 10/2019 | Hosseini | H04L 5/0091 |
| 2020/0112484 | A1* | 4/2020 | Sun | H04L 5/003 |
| 2020/0145984 | A1* | 5/2020 | Hosseini | H04W 72/23 |
| 2020/0154413 | A1* | 5/2020 | Hosseini | H04W 72/0446 |
| 2020/0177254 | A1* | 6/2020 | Lee | H04W 76/27 |
| 2020/0329461 | A1* | 10/2020 | Yang | H04W 48/12 |
| 2020/0334416 | A1* | 10/2020 | Vianu | G06V 10/764 |
| 2021/0168782 | A1* | 6/2021 | Hamidi-Sepehr | |
| | | | | H04W 72/0446 |
| 2021/0176656 | A1* | 6/2021 | Sang | H04W 24/10 |
| 2022/0225393 | A1* | 7/2022 | Gao | H04L 5/0053 |
| 2024/0063990 | A1* | 2/2024 | Wang | H04L 5/001 |

FOREIGN PATENT DOCUMENTS

| | | | |
|---|---|---|---|
| WO | WO-2011026383 | A1 | 3/2011 |
| WO | 2013097120 | A1 | 7/2013 |
| WO | 2018126777 | A1 | 7/2018 |
| WO | WO-2018231812 | A1 | 12/2018 |

OTHER PUBLICATIONS

OPPO, "PDCCH enhancements for URLLC " 3GPP TSG RAN WG1 #96bis, R1-1904042, Xi'an, China, Apr. 8-12, 2019, 6 pages.

VIVO, "PDCCH enhancements for URLLC," 3GPP TSG RAN WG1 #96bis, R1-1904081, Xi'an, China, Apr. 8-12, 2019, 6 pages.

Ericsson, "PDCCH Enhancements for NR URLLC," 3GPP TSG-RAN WG1 Meeting #96bis, Tdoc R1-1904122, Xi'an, China, Apr. 8-12, 2019, 12 pages.

ZTE, "On PDCCH enhancements for NR URLLC," 3GPP TSG RAN WG1 #96bis, R1-1904143, Xi'an, China, Apr. 8-12, 2019, 9 pages.

Intel Corporation, "On PDCCH enhancements for eURLLC," 3GPP TSG RAN WG1 #96bis, R1-1904305, Xi'an, China, Apr. 8-12, 2019, 9 pages.

Samsung, "DL Control for URLLC," 3GPP TSG RAN WG1 #96bis, R1-1904440, Xian, China, Apr. 8-12, 2019, 3 pages.

MediaTek Inc., "PDCCH enhancements for NR URLLC," 3GPP TSG RAN WG1 Meeting #96b, R1-1904503, Xi'an, China, Apr. 8-Apr. 12, 2019, 7 Pages.

LG Electronics, "PDCCH enhancements for NR URLLC," 3GPP TSG RAN WG1 #96bis, R1-1904627, Xi'an, China, Apr. 8-12, 2019, 4 pages.

Spreadtrum Communications, "Discussion on PDCCH enhancements for URLLC," 3GPP TSG RAN WG1 #96bis, R1-1904775, Xi'an, China, Apr. 8-12, 2019, 5 pages.

Nokia, "On PDCCH Enhancements for NR URLLC," 3GPP TSG RAN WG1 Meeting #96bis, R1-1904827, Xi'an, China, Apr. 8-12, 2019, 10 pages.

InterDigital Inc., "On DCI Enhancements for URLLC," 3GPP TSG RAN WG1 #96bis, R1-1904882, Xi'an, China, Apr. 8-12, 2019, 3 pages.

Motorola Mobility et al., "PDCCH Enhancements for URLLC," 3GPP TSG RAN WG1 #96bis, R1-1904929, Xi'an, China, Apr. 8-12, 2019, 2 pages.

NTT DOCOMO, Inc., "PDCCH enhancements for URLLC," 3GPP TSG RAN WG1 #96bis, R1-1904957, Xi'an, China, Apr. 8-12, 2019. 7 pages.

Qualcomm Incorporated, "PDCCH Enhancements for eURLLC," 3GPP TSG-RAN WG1 Meeting #96b, R1-1905019, Xi'an, China, Apr. 8-12, 2019, 11 pages.

Asia Pacific Telecom, "PDCCH enhancements for NR URLLC," 3GPP TSG-RAN WG1 Meeting #96-Bis, R1-1905061, Xi'an, China, Apr. 8-Apr. 12, 2019, 3 pages.

Panasonic, "PDCCH enhancements for NR URLLC," 3GPP TSG RAN WG1 #96bis, R1-1905091, Xi'an, China, Apr. 8-12, 2019, 4 pages.

Sequans, "PDCCH enhancements for URLLC," 3GPP TSG RAN WG1 #96bis, R1-1905121, Xi'an, China, Apr. 8-12, 2019, 5 pages.

CATT, "PDCCH enhancements for URLLC," 3GPP TSG RAN WG1 Meeting #96bis, R1-1905359, Xi'an, China, Apr. 8-12, 2019, 10 pages.

WILUS Inc., "On DCI enhancement for NR URLLC," 3GPP TSG RAN WG1 #96bis, R1-1905430, Xi'an, China, Apr. 8-12, 2019, 3 pages.

AD-HOC Chairntt DOCOMO, Inc., "Chairman's notes of AI 7.1.7" 3GPP TSG RAN WG1 #96bis R1-1905800, Apr. 12, 2019 (Apr. 12, 2019), entire document.

Huawei et al., "PDCCH enhancements for URLLC", 3GPP TSG RAN WG1 Meeting #96bis R-1-1903954, Apr. 12, 2019 (Apr. 12, 2019), entire document.

Huawei, "Summary of 7.2.6.1 PDCCH enhancements", 3GPP TSG RAN WG1 Meeting #96bis R1-195656, Apr. 12, 2019 (Apr. 12, 2019), text, section 2.2.

International Search Report for Application No. PCT/CN2020/087736, dated Aug. 3, 2020, 4 pages including translation.

OPPO, "PDCCH enhancements for URLLC " 3GPP TSG RAN WG1 Meeting #95 R1-1812815, Spokane, USA, Nov. 12-16, 2018, 4 pages.

VIVO, "Remaining details on PDCCH search space", 3GPP TSG RAN WG1 Meeting #92 R1-1801531, Athens, Greece, Feb. 26-Mar. 2, 2018, 6 pages.

QUALCOMM Inc., "Summary of the e-mail discussion [89-04] on sPDCCH Design for sTTI ", 3GPP TSG RAN WG1 Meeting #90 R1-1712795, Prague, Czech Republic, Aug. 21-25, 2017, 27 pages.

Supplementary Partial European Search Report for Application No. 20799512.7, dated Jan. 10, 2023, 21 pages.

First Search Report in Chinese Application No. 2019103642991, dated Dec. 25, 2024, 5 pages, including translation.

First Office Action in Chinese Application No. 201910364299.1, dated Dec. 31, 2024, 14 pages, including translation.

Second Office Action in Chinese Application No. 201910364299.1 dated Apr. 30, 2025, 24 pages including translation.

Supplemental Search Report in Chinese Application No. 2019103642991, 2 pages including translation.

Ericsson, "Remaining issue of search space", 3GPP TSG-RAN WG1 Meeting #93, R1-1807247, Busan, Korea, May 21-25, 2018.

* cited by examiner

Determine a first threshold value according to a preset rule, where the first threshold value is a threshold value of each span in a span pattern — S11

FIG. 1

Determine a second threshold value, where the second threshold value is a threshold value corresponding to each combination in the combination set reported by the user equipment — S21

Determine the first threshold value according to the second threshold value — S22

FIG. 2

Determine a resource that should be reserved or a resource that should be dropped by utilizing a threshold value of a span — S31

FIG. 3

If a sum of threshold values of all spans within a same slot is greater than a slot threshold value, then calculate an average threshold value of all spans within a slot according to the slot threshold value — S41

Re-determine a threshold value of each span within the slot according to the average threshold value of the all spans within the slot — S42

Determine a resource that should be reserved or a resource that should be dropped by utilizing a threshold value of a span — S31

FIG. 4

| UE capability | Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| | MO | | | | | | | | | | | | | | |
| | MO | | | | | | | | | | | | | | |
| (2,2) and (4,3) and (7,3) | Span | | | | | | | | | | | | | | |
| | | | | | | | | | | | | | | | |
| (7,3) | Span | | | | | | | | | | | | | | |
FIG. 8
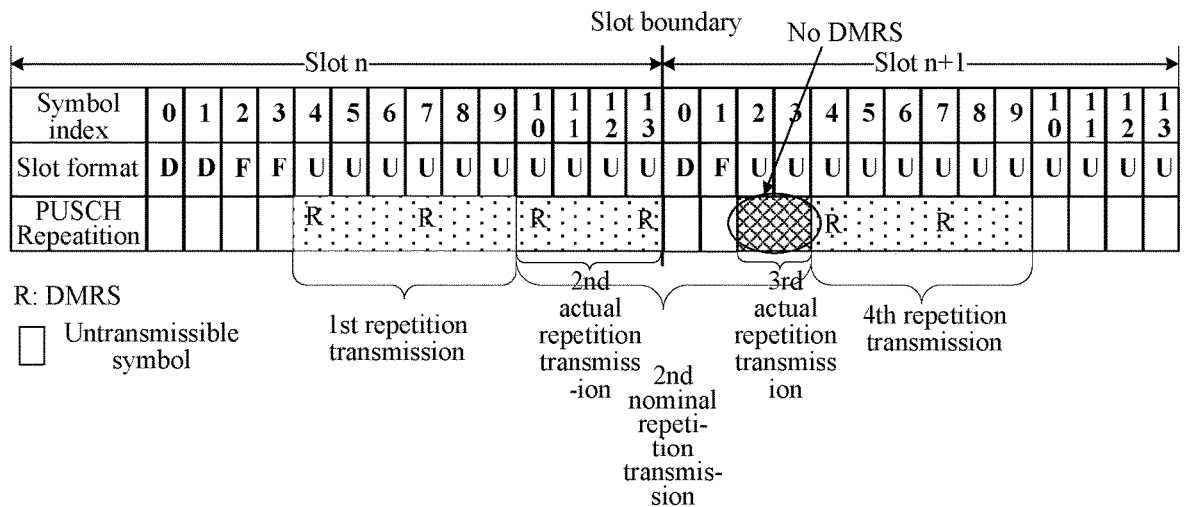
FIG. 9A
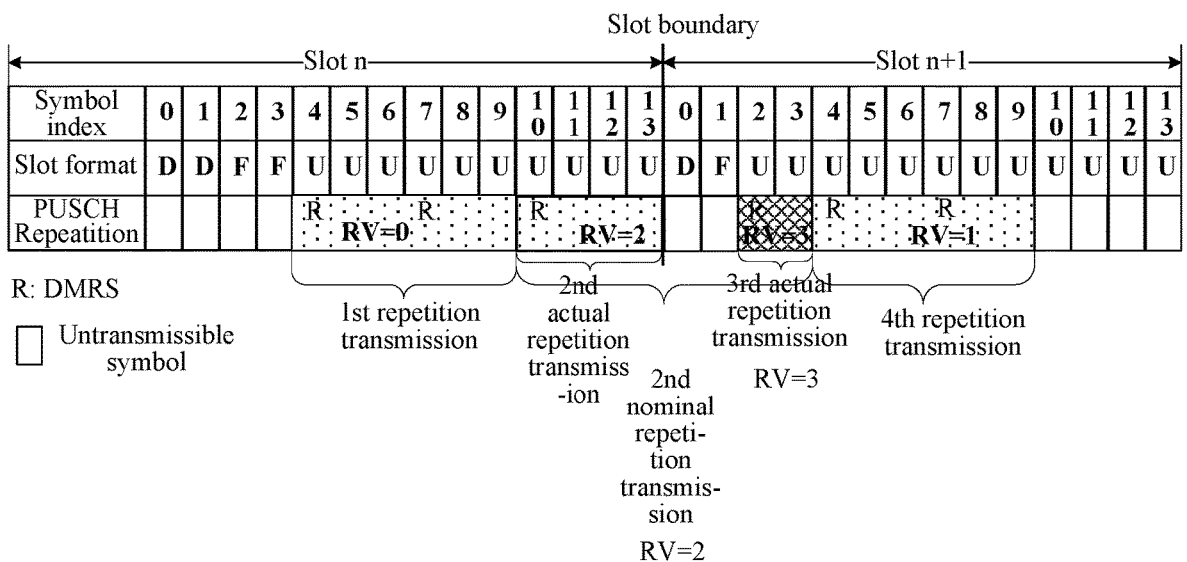
FIG. 9B

US 12,396,014 B2

THRESHOLD VALUE, RESOURCE DETERMINATION METHOD, APPARATUS, NETWORK DEVICE, AND STORAGE MEDIUM

CROSS-REFERENCE TO RELATED APPLICATION

This is a national stage application filed under 37 U.S.C. 371 based on International Patent Application No. PCT/CN2020/087736, filed on Apr. 29, 2020, which claims priority to Chinese Patent Application No. 201910364299.1, filed with the China National Intellectual Property Administration (CNIPA) on Apr. 30, 2019, disclosure of which is incorporated herein by reference in its entirety.

TECHNICAL FIELD

The present application relates to the field of communications, and for example, a threshold value determination method and apparatus, a resource determination method and apparatus, a network device, and a storage medium.

BACKGROUND

The 4th generation mobile communication technology (4G) long-term evolution (LTE), long-term evolution advance (LTE-Advance/LTE-A) and the 5th generation mobile communication technology (5G) face more and more demands. From the development trend, both a 4G system and a 5G system are studying the features of supporting enhanced mobile broadband, ultra-high reliability, ultra-low delay transmission and massive connectivity.

In order to support the features of the ultra-high reliability and the ultra-low delay transmission, it is necessary to transmit with a shorter transmission time interval at a lower code rate, and the shorter transmission time interval may be a single orthogonal frequency division multiplexing (OFDM) symbol or several orthogonal frequency division multiplexing (OFDM) symbols. For a downlink control channel (physical downlink control channel, PDCCH), in the related art, a low delay transmission is ensured by providing a sending opportunity at multiple occasion locations within a slot to reduce waiting time after data reaches, and a high reliable transmission is ensured by a high aggregation level. Since a blind detection number threshold (maximum number of blind decode, BD threshold) and/or a non-overlapping control resource element number threshold (maximum number of non-overlapping CCEs for channel estimation, CCE threshold for short) of a new radio release 15 (NR R15) system is insufficient in supporting R16 URLLC traffic, especially a number of control channel elements (CCEs) at the multiple occasion locations is difficult to support the high aggregation level, it is necessary to increase a corresponding threshold value. When the corresponding threshold value is increased, it is necessary to determine how long the increased threshold value is defined in units of time. If a threshold value of two or more duration units is present, an actual number of blind detections and/or a number of control resource elements need to be determined.

A blind detection number threshold of a NR R15 system and/or the non-overlapping control resource element number threshold for the channel estimation may not conform to an actual number of candidate sets, the actual number of candidate sets may exceed the aforementioned threshold, and a dropped candidate set need to be determined.

SUMMARY

An embodiment of the present application provides a threshold value determination method. The method includes: a first threshold value is determined according to a preset rule, where the first threshold value is a threshold value of each span in a span pattern.

An embodiment of the present application provides a resource determination method. The method includes: a reserved resource or a dropped resource is determined by utilizing a threshold value of a span; where the resource includes a candidate set, or all candidate sets within a search space, or all candidate sets of the search space within a span, or candidate sets of all search spaces within the span.

An embodiment of the present application provides a threshold value determination apparatus. The threshold value determination apparatus includes a first threshold value determination module. The first threshold value determination module is configured to determine a first threshold value according to a preset rule, where the first threshold value is a threshold value of each span in a span pattern.

An embodiment of the present application provides a resource determination apparatus. The resource determination apparatus includes a resource determination module. The resource determination module is configured to determine a reserved resource or a dropped resource by utilizing a threshold value of a span; where the resource includes a candidate set, or all candidate sets of a search space within a span, or candidate sets of all search spaces within the span.

An embodiment of the present application provides a network device. A base station includes a processor and a memory. The memory is configured to store instructions. The processor is configured to read the instructions to perform the method in the embodiments of the present application.

An embodiment of the present application provides a storage medium. The storage medium stores a computer program. The computer program, when executed by a processor, implements any one of the methods provided in the embodiments of the present application.

According to the threshold value determination method in the embodiments of the present application, the threshold value of the each span in the span pattern is determined, so that a threshold value of a user equipment (UE) in a new system may be increased, different numbers of threshold values are supported for different user equipment capabilities, different numbers of resources may be handled by UEs with different capabilities, and the scheduling flexibility may be increased without increasing the system complexity. According to the resource determination method in the embodiments of the present application, a threshold value of a terminal in each slot not being exceeded may be ensured, the terminal processing complexity is not increased, a scene in which an excessive pre-determined within a slot or a span is allowed is applicable, and the flexibility of configuration and scheduling may be increased without exceeding the capability of the UE.

BRIEF DESCRIPTION OF DRAWINGS

FIG. 1 is a schematic flowchart of a threshold value determination method provided in an embodiment;

FIG. 2 is a schematic flowchart of a threshold value determination method provided in another embodiment;

FIG. 3 is a schematic flowchart of a threshold value determination method provided in another embodiment;

FIG. 4 is a schematic flowchart of a threshold value determination method provided in another embodiment;

FIG. 8 is a schematic diagram of a threshold value determination method provided in another embodiment;

FIG. 9A to 9C are schematic diagrams showing repeated transmissions of a same transport block over continuous available slots provided in an embodiment of the present application;

DETAILED DESCRIPTION

Figure 5:
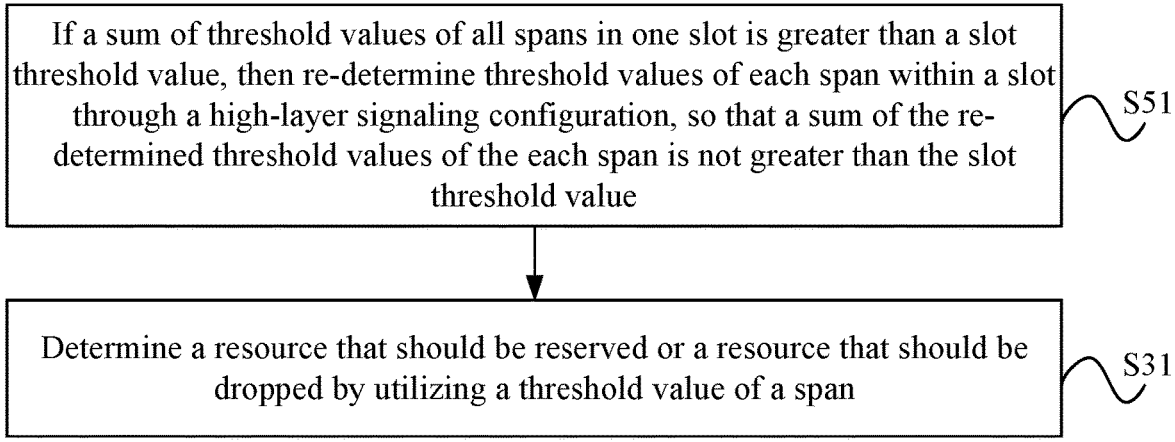
FIG. 5 is a schematic flowchart of a threshold value determination method provided in another embodiment.

Hereinafter, embodiments of the present application will be described in detail with reference to the accompanying drawings. It should be noted that the embodiments of the present application and features of the embodiments may be arbitrarily combined with each other without conflict.

As shown in FIG. 1, the present application provides a threshold value determination method. The threshold value determination method includes described below.

In step S11, a first threshold value is determined according to a preset rule, where the first threshold value is a threshold value of each span in a span pattern.

In the embodiments of the present application, the span pattern is a pattern consisting of all spans within a certain time range, and a certain time unit may be a slot.

In the embodiments of the present application, first threshold values of different spans may be the same or may be different.

In the embodiments of the present application, the span pattern is determined according to a combination set reported by a user equipment and high-layer signaling of a system. It is to be understood that the combination set is also named as combinations in the present application. Accordingly, the span pattern is determined according to the combinations reported by the user equipment and the high-layer signaling of the system.

In an implementation, as shown in FIG. 2, the step in which the first threshold value is determined includes described below.

In step S21, a second threshold value is determined, where the second threshold value is a threshold value corresponding to each combination in the combination set reported by the user equipment.

In step S22, the first threshold value is determined according to the second threshold value.

In the embodiments of the present application, the each combination in the combination set is represented by (X, Y), where X and Y are two natural numbers, respectively. X represents a starting interval of the span, and Y represents a duration of the span.

In the embodiments of the present application, the combination set reported by the UE may include a set formed by a combination of multiple (X, Y), where (X, Y) may take at least one of (1,1), (2,1), (2,2), (4,1), (4,2), (4,3), (7,1), (7,2), or (7,3). The UE reports a (X, Y) set, and possible (X, Y) combinations are {(7, 3)}, {(4, 3) and (7, 3)}, {(2, 2) and (4, 3) and (7, 3)}, etc.

In an implementation, the step in which the second threshold value is determined according to the preset rule includes: a second threshold value corresponding to the capability level of the user equipment is determined according to a capability level of the user equipment.

In the embodiments of the present application, the user equipment has a fixed capability level. Typically, the user equipment has two capability levels, i.e., a capability level 1 and a capability level 2.

In an implementation, the step in which the second threshold value is determined according to the preset rule includes: a maximum value of a number of spans which may be determined by a combination is determined according to the combination of the combination set; an average threshold value of each span is calculated according to the maximum value of the number of the spans and a slot threshold value; and a threshold value corresponding to the combination is determined according to the average threshold value of the each span.

In the embodiments of the present application, according to a minimum X in the combination set, and a quotient is obtained by dividing a slot length by the minimum X, a maximum integer value less than the quotient is taken, namely, the maximum value of the number of spans which may be determined is determined according to the combination of the combination set. For example, the combination set is {(4, 3), (7, 3)}, a maximum of a span calculated according to the combination set is a largest integer less than 14/4, i.e., 3.

In an implementation, a first threshold value corresponding to a span in which a search space or a monitoring opportunity for front L symbols within a slot is located is greater than a first threshold value corresponding to a remaining span, and L is a positive integer.

In the embodiments of the present application, a value of L is 3. Front 3 symbols within the slot are case1-1.

In an implementation, the step in which the first threshold value is determined according to the preset rule includes: the first threshold value is determined according to a total threshold value within a slot and a number of spans within a slot.

In an implementation, the first threshold value is determined according to a total threshold value within a slot and a number of spans within a slot, where a first threshold value of a span in which a search space or a monitoring opportunity for front L symbols within the slot is located is determined in following manners: a third threshold value is determined according to the total threshold value within the slot and the number of the spans within the slot, where the third threshold value is a maximum threshold value obtained by each span in a case where the total threshold value within the slot is averagely distributed to the each span; and a remaining number within the slot is distributed to a threshold value of the span in which the search space or the monitoring opportunity for the front L symbols within the slot is located, to obtain the first threshold value, where the remaining number is a number remaining after a product of the total threshold value minus the third threshold value and the number of the spans within the slot, and L is a positive integer.

In the embodiments of the present application, the third threshold value is a maximum integer less than a quotient of the total threshold value within the slot divided by the number of the spans within the slot. For example, the total threshold value of the slot is 50, the number of the spans is 6, and the third threshold value is a maximum integer less than 50/6, i.e., 8.

In an implementation, a first threshold value of a span in which a search space or a monitoring opportunity for front L symbols within the slot is located is determined in following manners: the first threshold value corresponding to the span in which the search space or the monitoring opportunity for the front L symbols within the slot is located is equal to a sum of a slot threshold value and a second threshold value, and L is a positive integer.

In the embodiments of the present application, a value of L is 3. Front 3 symbols within the slot are case1-1.

In an implementation, a first threshold value of a span in which a search space or a monitoring opportunity for front L symbols within the slot is located is determined in following manners: the first threshold value corresponding to the span in which the search space or the monitoring opportunity for the front L symbols within the slot is located is equal to a sum of a slot threshold value and a third threshold value, and L is a positive integer.

In the embodiments of the present application, a value of L is 3. Front 3 symbols within the slot are case1-1.

In an implementation, the step in which the first threshold value is determined includes: a first offset value is added on the basis of a second threshold value to obtain the first threshold value according to a length of a span.

In the embodiments of the present application, the offset value is obtained according to the setting or calculation.

In an implementation, the step in which the first threshold value is determined includes: when an actual number of spans within a slot is less than a maximum number of spans, a second offset value is added to a second threshold value to obtain the first threshold value.

In the embodiments of the present application, the offset value is obtained according to the setting or calculation.

In an implementation, the preset rule includes at least one of: if a combination set includes a combination (7, 3) and an actual span pattern is derived from the combination (7, 3), then the first threshold value is determined by adopting a second threshold value corresponding to the combination (7, 3); if the combination set includes the combination (4, 3) and the actual span pattern is derived from the combination (4, 3), then the first threshold value is determined by adopting a second threshold value corresponding to the combination (4, 3); if the actual span pattern only has 1 span, then the first threshold value is determined by adopting a slot threshold value; or if the actual span pattern is other situations except the situation described above, then the first threshold value is determined by adopting a second threshold value corresponding to a combination (2, 2).

In an implementation, the step in which the first threshold value is determined according to the second threshold value includes: if an actual span pattern of a partial span in a slot is derived from the combination (7, 3), then the first threshold value is determined by adopting a second threshold value corresponding to the combination (7, 3); and if the actual span pattern of the partial span in the slot is derived from the combination (2, 2), the first threshold value is determined by adopting a second threshold value corresponding to the combination (2, 2).

In an implementation, the step in which the first threshold value is determined according to the preset rule includes: the first threshold value is configured by high-layer signaling. Further, a first threshold value of each span is independently configured, or a same first threshold value is configured for all the spans.

In an implementation, the first offset value is an integer and is at least one between -N and N, and N is a positive integer.

In an implementation, N is a subset in {2, 4, 6, 8, 10, 16, 24, 32, 36, 42, 48, 48, 56, 64}.

In an implementation, the threshold value is a blind detection number threshold or a non-overlapping control resource element number threshold.

The present application provides a resource determination method, as shown in FIG. 3, and the resource determination method includes described below.

In S31: a resource that should be reserved or a resource that should be dropped is determined by utilizing a threshold value of a span.

The resource includes a candidate set, or all candidate sets within a search space, or all candidate sets of the search space within a span, or candidate sets of all search spaces within the span.

In the embodiments of the present application, the resource that should be reserved is a resource that is a monitoring target. The resource that should be dropped is a resource that exceeding a threshold value and needing to be dropped for monitoring.

In an implementation, the reserved resource or the dropped resource is determined by utilizing the threshold value of the span includes: if a sum of threshold values of all spans within a same slot is greater than a slot threshold value, then determining, according to a sequence of all spans within a slot, a candidate set of a span of a critical value index and a candidate se of all spans after the span of the critical value index are determined as a candidate set that should be dropped; or a candidate set of all spans before the span of the critical value index is determined as a candidate set that should be reserved; and a sum of accumulated threshold values from a span ranked first within the slot to the span of the critical value index exceeds the slot threshold value for the first time.

In an implementation, the step in which the resource that should be reserved or the resource that should be dropped is determined by utilizing the threshold value of the span includes: if a number of resources within one span is greater than the threshold value of the span, part of resources exceeding the threshold value of the span is determined as the resource that should be dropped; or part of candidate sets not exceeding the threshold value of the span are determined as the reserved resource.

In an implementation, when the resource is the candidate set, a method of dropping or reserving includes one of: a rank of an aggregation level of part of candidate sets exceeding the threshold value of the span is greater than a rank of an aggregation level of the other part of candidate sets not exceeding the threshold value of the span; a rank of an aggregation level of the part of candidate sets exceeding the threshold value of the span is less than a rank of an aggregation level of the other part of candidate sets not exceeding the threshold value of the span; or a certain number of candidate sets are sequentially reserved by each aggregation level until the certain number of candidate sets exceeds the threshold value of the span, or a certain number of candidate sets are sequentially dropped by each aggregation level until the remaining number of candidate sets exceeds the threshold value of the span, where the certain number is a preset or configured same number or a numerical pattern corresponding to each aggregation level.

In the embodiments of the present application, the value pattern corresponding to each aggregation level is a pattern of a number of candidate sets reserved or dropped at a time by the each aggregation level, for example 0,1,1,2, 2 for aggregation level (AL)=16,8,4,2,1 represents that 0,1,1,1, 2,1 candidate sets are reserved or dropped at a time for the aggregation level 16,8,4,2,1.

In an implementation, as shown in FIG. 4, before the resource that should be reserved or the resource that should be dropped is determined by utilizing the threshold value of the span, the method further includes described below.

In step S41, if a sum of threshold values of all spans within a same slot is greater than a slot threshold value, then an average threshold value of all spans within a slot is calculated according to the slot threshold value.

In step S42, a threshold value of each span within the slot is re-determined according to the average threshold value of the all spans within the slot.

In an implementation, as shown in FIG. 5, before the resource that should be reserved or the resource that should be dropped is determined by utilizing the threshold value of the span, the method further includes described below.

In step S51, if a sum of threshold values of all spans in one slot is greater than a slot threshold value, then threshold values of each span within a slot are re-determined through a high-layer signaling configuration, so that a sum of the re-determined threshold values of the each span is not greater than the slot threshold value.

Figure 6:
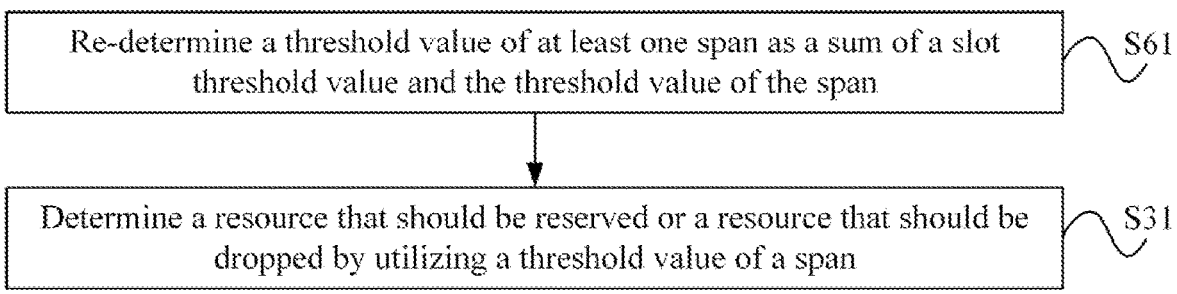
FIG. 6 is a schematic flowchart of a threshold value determination method provided in another embodiment.

In an implementation, as shown in FIG. 6, before the resource that should be reserved or the resource that should be dropped is determined by utilizing the threshold value of the span, the method further includes described below.

In step S61, a threshold value of at least one span is re-determined as a sum of a slot threshold value and the threshold value of the span.

In the embodiments of the present application, the step in which the threshold value of the at least one span is re-determined as the sum of the slot threshold value and the threshold value of the span represents that the threshold value of the at least one span is re-determined as a sum of the slot threshold value and a threshold value of an original span.

Figure 7:
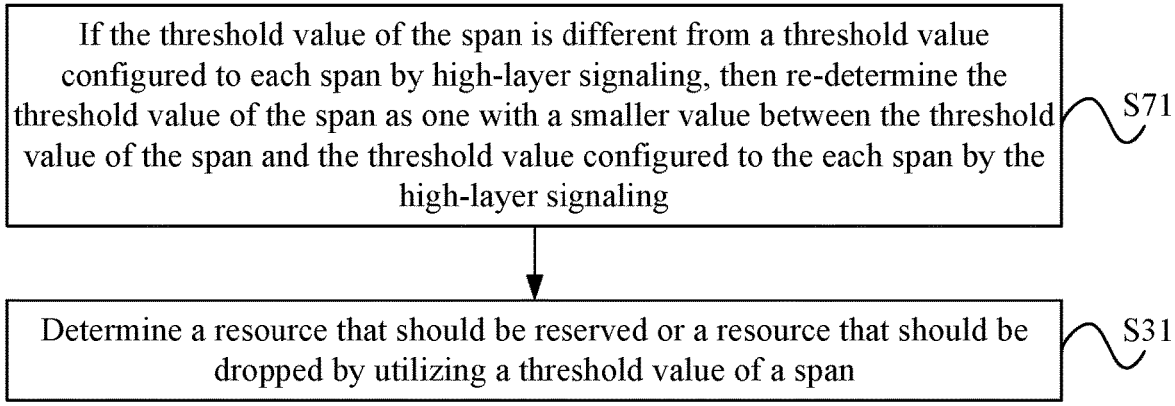
FIG. 7 is a schematic flowchart of a threshold value determination method provided in another embodiment.

In an implementation, as shown in FIG. 7, before the resource that should be reversed or the resource that should be dropped is determined by utilizing the threshold value of the span, the method further includes described below.

In step S71, if the threshold value of the span is different from a threshold value configured to each span by high-layer signaling, then the threshold value of the span is re-determined as one with a smaller value between a threshold value of an original span and the threshold value configured to the each span by the high-layer signaling.

In an implementation, the step in which the resource that should be reserved or the resource that should be dropped is determined by utilizing the threshold value of the span includes: the resource that should be reserved or the resource that should be dropped is determined according to a slot threshold value firstly, and then the resource that should be reserved or the resource that should be dropped is determined according to the threshold value of the span.

In an implementation, the step in which the resource that should be reserved or the resource that should be dropped is determined by utilizing the threshold value of the span includes: the resource that should be reserved or the resource that should be dropped is determined according to the threshold value of the span firstly, and then the resource that should be reserved or the resource that should be dropped is determined according to a slot threshold value.

In an implementation, the step in which the resource that should be reserved or the resource that should be dropped is determined according to the threshold value of the span firstly, and then the resource that should be reserved or the resource that should be dropped is determined according to the slot threshold value includes: the resource that should be reserved or the resource that should be dropped is determined according to the threshold value of the span; if the reserved resource exceed the slot threshold value, then a candidate set of all spans after a span of a critical value index is determined as a dropped candidate set according to a sequence of all spans within a slot, and part of candidate sets of the span of the critical value index is determined as the dropped candidate set; or a candidate set of all spans before the span of the critical value index is determined as a reserved candidate set, and part of candidate sets of the span of the critical value index id determined as the reserved candidate set; and a sum of accumulated threshold values from a span ranked first within the slot to the span of the critical value index exceeds the slot threshold value for the first time.

In an implementation, the step in which when the resource includes all candidate sets of the search space within a current span, the reserved resource or the dropped resource is determined by utilizing the threshold value of the span includes: if a slot threshold value does not exist, then determining, according to a sequence of the search space within the span, a candidate set of a search space of a critical value index and a candidate set of all search spaces after the critical value index are determined as a candidate set that should be dropped; or a candidate set of all search spaces before the search space of the critical value index is determined as a candidate set that should be reversed; and a sum of accumulated threshold values from a search space ranked first within the span to the search space of the critical value index exceeds the threshold value of the span for the first time.

In an implementation, the candidate set is a candidate set of a channel blind detection (BD) of a physical downlink control channel (PDCCH) upon corresponding to a blind detection (BD) threshold, or a candidate set of a non-overlapping CCE for channel estimation.

In an implementation, the threshold value of the span is a threshold value determined according to the threshold value determination method provided in the embodiments of the present application.

In the embodiments of the present application, the combination set is represented by {(X, Y)}, X is a starting interval of the span, and Y is a length of the span. For a R16 URLLC terminal, a threshold value lift is performed with respect to a R15 lift blind detection number threshold (Maximum number of Blind Decode, BD threshold for short) and/or a non-overlapping control resource element number threshold (maximum number of non-overlapping CCEs for channel estimation, CCE threshold for short) for channel estimation. Further, the BD threshold and/or the CCE threshold are defined, for example, at the granularity of the span, that is, the lifting of the BD threshold and/or the CCE threshold of each span is considered. The following describes only the CCE threshold as an example. Similarly, the BD threshold may also be adopted as follows.

Implementation 1

In one example, the span pattern may be determined in following manners: a span pattern in a slot is determined through the UE reporting a candidate (X, Y) set and PDCCH CORESET and a search space. Spans of the span pattern are not allowed to be overlapped, and the interval between starting points of the two spans is not less than X symbols. Span duration=Maximum (configured maximum CORESET duration, minimum Y reported by the UE), that is, a Y value is related to the span duration. Only a last span in the span pattern may be a shorter duration. A number of spans does not exceed floor (14/X), which is a value obtained by rounding down 14/X, where X is the minimum X in the values reported by the UE. For example, (X, Y) includes at least one of (1, 1), (2, 1), (2, 2), (4, 1), (4, 2), (4, 3), (7, 1), (7, 2), and (7, 3). For example, the UE reporting a candidate (X, Y) set includes at least one of {(7, 3), (4, 3)}, {(7, 3), (2, 2)}, (4, 3), and (7, 3).

A CCE threshold value M corresponding to each (X, Y) in the combination set is determined in a predefined manner, where M represents a number threshold value of CCEs corresponding to each combination in the combination set. As shown in Table 1 or Table 2 or Table 3, following tables are only specific embodiments of the present application and are not intended to be limiting of the present application. In addition, the CCE threshold value M corresponding to each span in the span pattern may also be determined by a pre-definition or a downlink control information (DCI) dynamic notification or a radio resource control (RRC) configuration. $M_K$ is adopted to represent the threshold value of the span, and K is a numbering of the span in the span pattern, namely, the first threshold value.

TABLE 1

| X | Y | M |
|---|---|---|
| 2 | 2 | 16 |
| 4 | 3 | 36 |
| 7 | 3 | 56 |

TABLE 2

| X | Y | M |
|---|---|---|
| 1 | 1 | 16 |
| 2 | 2 | 16 |
| 4 | 3 | 36 |
| 7 | 3 | 56 |

TABLE 3

| X | Y | M |
|---|---|---|
| 1 | 1 | 16 |
| 2 | 1 | 16 |
| 2 | 2 | 16 |
| 4 | 1 | 16 |
| 4 | 2 | 24 |
| 4 | 3 | 36 |
| 7 | 1 | 36 |
| 7 | 2 | 48 |
| 7 | 3 | 56 |

When considering different UE capabilities, M may be defined based on the span only for UE Capability 2 (capability 2), M represents a CCE threshold corresponding to the combination (X, Y) of the candidate set reported by the UE, i.e. a maximum number of non-overlapping CCEs for channel estimation. Table 1 or Table 2 or Table 3 is used for determining; the capability 1 of the UE (capability 1) may not support a CCE threshold of per span, only a CCE threshold of per slot of R15.

In an embodiment, for a same combination (X, Y), values of M corresponding to the two capabilities of the UE may be different. Further, two tables may be defined for the Capability 1 of the UE and the Capability 2 of the UE, respectively, and M values are defined, respectively; or a table is defined for one of the capabilities, and the offset is defined for the other capability, for example, the value of M adopting Table 1 or Table 2 or Table 3 is defined for the Capability 1 of the UE. For the Capability2 of the UE, the CCE threshold is M+offset, and the value of offset may be the same or different for different combinations (X, Y). The offset value may also be determined by a pre-definition or a DCI notification or a RRC configuration. In this embodiment, different maximum CCE numbers may be supported for different UE capabilities, and different UE capabilities process different numbers of CCE thresholds may be ensured.

Implementation 1.1

When it is assumed that $M_K$ is derived based on M and/or a slot threshold value of the span, a value of $M_K$ may be determined by following equation:

$$M_K\_per\_span = floor(M\_per\_slot/Max\_Num\_of\_span) = floor(M\_per\_slot/floor(14/X));$$

The threshold value of the slot is equally divided according to a maximum number of spans within the slot. Where X is a minimum X in the combination set reported by the UE. For example, M_per_slot=112. $M_K$ per span represents a value of M defined based on the span or the (X, Y), M_per_slot represents a value of M defined based on the slot, and Max_Num_of_span represents a maximum number of spans in the slot, for example, it is determined by floor (14/X). Or, the maximum number of Spans is floor (14/maximum (X, configured maximum CORESET duration)), where X is a minimum X in the UE reporting combination set, $M_K\_per\_span=floor(M\_per\_slot/Max\_Num\_of\_span)=floor(M\_per\_slot/floor(14/maximum$ (X, configured maximum CORESET duration)), equally divided by the maximum number of spans within the slot, where X is a minimum X in the UE reporting combination set. The CORESET duration is a core set duration.

Implementation 1.2

Assuming that $M_K$ is obtained based on M and/or a slot threshold value of the span, $M_K$ values of span at different positions of slot are not all the same. For example, a $M_k$ value of a span of the search space or monitoring opportunities containing front three symbols/case1-1 within the slot is greater than a $M_k$ value of remaining spans, case1-1 represents that the configured search space is concentrated in the front three symbols of the slot.

In one embodiment, M may be defined by a table similar to Table 1, Table 2, Table 3, M values define two, i.e., respectively corresponding to the span containing case1-1 and the remaining spans, and $M_K$ is obtained from M of the table.

In one embodiment, M may be defined by a table similar to Table 1, Table 2, Table 3, M values define one, remaining capabilities in M_per_slot is assigned to M of a span containing case1-1 so as to obtain $M_K$, such as, $M_K=M\_per\_span+(M\_per\_slot-Max\_Num\_of\_span*floor(M\_per\_slot/Max\_Num\_of\_span))$ corresponding to the span containing the case1-1. As another example, $M_K=M\_per\_span+(M\_per\_slot-Num\_of\_span*floor(M\_per\_slot/Max\_Num\_of\_span))$; where Num_of_span represents an actual number of spans in the slot. Max_Num_of_span=floor (14/maximum (X, configured maximum CORESET duration)).

Implementation 1.3

$M_K$ is determined according to the Y value on the basis of implementations 1.1, 1. (4, 1), (4, 2), (4, 3) are used as an example, M_per_span determined by the method of Embodiment 1.1 is the same. Thus, further, $M_K$=floor (M_per_slot/Max_Num_of_span)+offset, where offset is different in value for Y=1, 2, 3. For example, on a basis of (4, 1), (4, 2) and (4, 3) add a positive offset. As another example, (4, 1), (4, 2) are incremented by a negative offset based on (4, 3). According to the embodiments of the present application, the CCE threshold ($M_K$) of each span is determined in an equally divided or non-equally divided manner, and the method is applicable to different scenes, such as a pure ultra-reliable low latency communication (URLLC) scene, or an enhanced mobile broadband (eMBB) and URLLC coexistence scene.

In one implementation of the present application, after M is determined according to (X, Y), if a number of actual spans is less than a maximum number of spans, a total number of CCEs determined by a sum of the spans within the slot is less than M_per_slot, and an additional offset is added to $M_k$. Therefore, the scheduling flexibility is improved on the premise that the UE capability is not exceeded.

In one implementation of the present application, M is added, so that X and/or Y corresponding to $M_k$ are greater than M values corresponding to other (X, Y) except for current (X, Y). The actual $M_k$ value is determined, for example, according to at least one of a base station configuration, an actual number of spans, and a span interval. For example, with M_for_(2, 2)=16, when the number of actual spans is less than the maximum number of spans (e.g., floor (14/2)=7), when the number of actual spans is 2, $M_K$ uses a M value of (7, 3) or (7, 2) or (7, 1), e.g., M_for_(7, 3)=56. For another example, when the number of actual spans is 1, $M_K$ uses the M value of M_per_slot, e.g., M_per_slot=112. For another example, when the number of actual spans is 3, $M_K$ uses a value of M of (4, 3) or (4, 2) or (4, 1), such as, M_for_(4, 3)=36. For another example, when the actual span number is 5, $M_K$ still uses the M value of (2, 2) or (2, 1) and is not increased. For another example, when the number of actual spans is 2, but the span interval is 2 symbols, $M_K$ still uses the M value of (2, 2) or (2, 1) and is not increased. The above embodiments employ M_for_(X, Y) to represent a M value corresponding to the combination in the combination set reported by the UE.

In one embodiment, for a combination set {(2, 2) and (4, 3) and (7, 3)} reported by the UE, $M_K$ of span may be determined in such a way that: for UE reporting capability {(2, 2) and (4, 3) and (7, 3)}, $M_K$ of span is determined in following manners: if an actual span pattern can be derived from the combination (7, 3), which means that the actual span pattern can also be derived from combination (4, 3) or (2,2), as shown in FIG. 8, then $M_K$ of span is determined by using M_for_(7, 3), or if the actual span pattern can be derived from the combination (4, 3), which means that the actual span pattern can also be derived from the combination (2, 2), then $M_K$ of span is determined by using M_for_(4, 3), and if the actual span pattern has only 1 span, then M_per_slot is used to determine $M_K$ of span. For the remaining cases (i.e., the number of spans is greater than 3, or the span interval is less than 4, etc.) $M_K$ of span is determined by using M_for_(2, 2). The MO in FIG. 8 represents Monitoring Occasion. Further, for different K, the values of $M_K$ of span may be the same or not all the same. For another example, for a UE to report {(4, 3) and (7, 3)}, $M_K$ of span may be determined in such a way that for a UE reporting capability of {(4, 3) and (7, 3)}, $M_K$ of span is determined in such a way that: if an actual span pattern is derived from the combination (7, 3), which means that the actual span pattern can also be derived from the combination (4, 3), then $M_K$ of span is determined by using M_for_(7, 3), if the actual span pattern has only 1 span, then then $M_K$ of span is determined by using M_per_slot, and for the remaining cases (i.e., the number of spans is greater than 2, or the span interval is less than 7, etc.), $M_K$ of span is determined by using M_for_(4, 3). For another example, if the UE reports {(7, 3)}, $M_K$ of span may be determined in such a way that if the UE reporting capability is {(7, 3)}, $M_K$ of span is determined in following manners: if the actual span pattern has only 1 span, and then $M_K$ of span may be determined by using M_per_slot, for the remaining cases (i.e., a number of spans is greater than 1), $M_K$ of span is determined by using M_for_(7, 3).

In one implementation of the present application, when $M_K$ values for different K are allowed to be different, an example method is as follows: for the combination set reported by the UE being {(2, 2) and (4, 3) and (7, 3)}, $M_K$ of span may be determined in following manners: if an actual span pattern (e.g., front half of the slot) of a partial span in the slot is derived from the combination (7, 3), which means that the actual span pattern can also be derived from the combination (2, 2) or (4, 3), then M_for_(7,3) is used to determine $M_K$ for the partial span; and when the actual span pattern (e.g., rear half of the slot) of the partial span is derived from the combination (2,2), M_for_(2,2) is used to determine $M_K$ of the partial span.

In one implementation of the present application, after M is determined according to (X, Y), when an actual span duration is greater than Y (i.e., the CORESET duration is greater than Y), the offset is increased on the basis of M to obtain $M_K$. Since M_per_span is defined according to M_for_(X, Y), when the actual span duration is greater than Y, it may result in insufficient CCE in the actual span, increasing the offset may improve the scheduling flexibility.

In one implementation of the present application, an offset value is an integer and is between at least one between –N and N, for example, N is a subset of the set {2, 4, 6, 8, 10, 16, 24, 32, 36, 42, 48, 56, 64}. The offset may be determined in a pre-definition, a dynamic notification, or a semi-static configuration.

According to the threshold value determination method provided in the embodiments of the present application, a CCE threshold of each span is determined in an equal division or non-equal division manner, and the threshold value determination method is suitable for different scenes, such as a pure URLLC scene or an eMBB and URLLC coexistence scene. When the number of actual spans is relatively small or an actual span duration is relatively long, a certain CCE threshold adjustment amount is allowed to be increased, and the scheduling flexibility is improved on the premise that the capacity of the UE is not exceeded.

The above embodiments of the present application may also be used for determining a BD threshold of a blind detection, and the calculation method is the same.

Implementation 2

In this implementation, a resource that needs to be dropped or reserved may be determined at the granularity of span. In this implementation, it is defined by adopting the span in the implementation 1, a CCE threshold of per span is used as an example, but is not limited thereto.

When the CCE threshold (M_per_slot) of per slot and the CCE threshold (M_per_span, i.e., $M_K$ of span) of per span are defined simultaneously, when a sum (ΣM_per_span) of the number of CCEs of each span in 1 slot is not equal to M_per_slot, for example, when ΣM_per_span>M_per_slot, the processing method includes one of the following.

Implementation 2.1

M_per_span is recalculated and the sum being not greater than M_per_slot is satisfied; and a new smaller M_per_span may be obtained by re-equalizing M_per_slot sharing. For example, M_per_span=16, M_per_slot=80, if there are 6 spans in one slot, then ΣM_per_span=96>80, thus a new M_per_span=floor 80/6=13 is recalculated. Further, optionally, it is aligned to one of values in a set (1, 2, 4, 8, 12, 16, 20, 24, 32, 36, 40, 48, 56, 64) in a closest principle, a new M_per_span is 12, and a candidate set is dropped according to the recalculated M_per_span (candidate).
Implementation 2.2
Part span is dropped. For example, the UE monitors a current span when a total number of CCEs accumulated in the span index order does not exceed M_per_slot; when the current span is accumulated and the total number of CCEs exceeds M_per_slot, the UE no longer monitors the occasion in a current span and a subsequent span so that the sum not being greater than M_per_slot is satisfied; that is, the M_per_span value is not changed, and a number of candidate sets corresponding to the span is reduced.
Implementation 2.3
The base station divides the M_per_slot into M_1, M_2, ..., M_n according to the number of spans, where n is a number of spans, M_per_span is compared with M_1, M_2, ..., M_n, and when M_per_span<=M_i, according to M_per_span; When M_per_span>M_i, a candidate set needing to be dropped or reserved is determined according to the M_i.
Implementation 2.4
The base station configures an upper limit $M_K$ of each span to ensure that a sum of MKs of each configured span does not exceed M_per_slot. For example, the configured $M_K$ is always not greater than M determined from (X, Y) reported by the UE. The candidate set needing to be dropped or reversed is determined based on $M_K$.

In this implementation, with the resource determination method described in this embodiment, a candidate set dropping (candidate dropping) or a candidate set reserving is determined based on a span granularity manner, which may ensure that a CCE threshold of a terminal in each slot is not exceeded, and does not increase the terminal processing complexity, and is applicable to an over-reservation (over-booking) scene allowed within a slot or a span. The flexibility of configuration and scheduling is increased without exceeding the capability of the UE.
Implementation 3
In this implementation, a reversed resource or a dropped resource are determined at the granularity of a candidate set, a search space, a span. In this implementation, it is defined by adopting a span in the implementation 1, a CCE threshold of per span is used as an example, but is not limited thereto.

When there is only M_per_span restriction and there is no M_per_slot restriction, the terminal performs the candidate dropping according to the span granularity, that is, accumulates candidate in ascending order of a search space (SS) index to judge whether candidate exceeds M_per_span, if not, it is an actual valid candidate, and when M_per_span is exceeded, it drops all or part of candidate sets of a current search space. For example, when some candidate sets are dropped, the corresponding candidate is dropped in ascending (or descending) order of aggregation levels until M_per_span is not exceeded, or the same number (or a configured, or preset, dropped value pattern (e.g. 0, 1, 1, 2, 2 for AL=16, 8, 4, 2, 1) of candidate sets are dropped in ascending order of aggregation levels until M_per_span is not exceeded.

In this implementation, $M_K$ may be determined from M_per_span, and then a dropped or reversed candidate set may be determined from $M_K$.
Implementation 4
In this implementation, a retention or dropping is determined at the granularity of a candidate set, a search space, a span. In this implementation, it is defined by adopting a span in the implementation 1, a CCE threshold of per span is used as an example, but is not limited thereto.

When an M_per_span limit and an M_per_slot limit exist at the same time, that is, when the CCE threshold (M_per_slot) of the per slot and the CCE threshold (M_per_span) of per span are defined at the same time, the dropped candidate set may be determined in following manner.
Implementation 4.1
For a first span within the slot, which may contain a span of at least one of front three symbols within the slot, a total threshold is determined according to M_per_slot+M_per_span, and a candidate dropping is performed; for remaining spans, the candidate dropping is performed according to M_per_span.
Implementation 4.2
Firstly, a candidate set needing to be dropped or reserved is determined according to M_per_slot, and a slot-level candidate dropping is performed; then the candidate set needing to be dropped or reserved is determined according to the M_per_span, and the candidate dropping of the span level is performed so that the candidate neither exceeds the slot threshold value nor the threshold value of the span. For example, CSS0 has 4 candidates and is located in a first span, CSS1 has 4 candidates and is located in the first span, USS1 has 6 candidates and is located in the first span, USS2 has 36 candidates and is located in 3 span, each span has 12 candidates; assuming M_per_span=16, M_per_slot=40, then the slot-level candidate dropping is firstly performed according to M_per_slot, and the granularity of search space being dropped is used as an example, then USS2 is dropped. Next, The span level candidate dropping is performed according to M_per_span, and then CSS1, CSS2, and USS1 are not dropping.

For another example, CSS0 has 4 candidates and is located in the first span, CSS1 has 4 candidates and is located in the first span, USS1 has 6 candidates and is located in the first span, USS2 has 24 candidates and is located in 2 spans, each span has 12 candidates; assuming M_per_span=16, M_per_slot=40, then the slot-level candidate dropping is firstly performed according to M_per_slot, and the granularity of search space being dropped is used as an example, then all search spaces are not dropping. Next, a candidate dropping of the span level is performed according to M_per_span, in the first span, CSS1, CSS2, USS1 are not dropped and 12 candidates of USS2 are dropped, and a candidate of USS2 in a second span is not dropped. The USS represents a numbering of a dedicated search space (UE-specific Search Space), and the CSS represents a search space numbering of a common search space.

In an embodiment, a candidate set reversed or dropped determination granularity of the slot may be the same as or different from a candidate set reversed or dropped granularity of the span, and the optional granularity is the entire search space, the entire search space within a span, a candidate set of a search space. For example, it is dropped at SS granularity within a slot and it is drop at candidate set granularity within a span so as to ensure that candidate sets of one USS within a span are not all dropped, or the retention or dropping is determined by using the candidate set as the granularity within the slot and the span.

Implementation 4.3

The candidate dropping of the span level is performed firstly according to the M_per_span, and then the candidate dropping of a slot level is performed according to the M_per_slot, so that the candidate cannot exceed the respective thresholds at the slot level and the span level. For example, CSS0 has 4 candidates and is located in the first span, CSS1 has 4 candidates and is located in the first span, USS1 has 6 candidates and is located in the first span, USS2 has 36 candidates and is located in 3 spans, each span has 12 candidates; assuming that M_per_span=16, M_per_slot=40, then the span level candidate dropping is firstly performed according to M_per_span, and the granularity of search space is dropped as an example, then the USS2 in the first span is dropped, and the second span and the third span do not exceed the M_per_span threshold after being judged respectively, and the dropping is not required. The candidate dropping of the slot level is then performed according to the M_per_slot, and no further drop is required because a sum of candidates of all search space does not exceed the M_per_slot. For another example, CSS0 has 4 candidates and is located in the first span, CSS1 has 4 candidates and is located in the first span, USS1 has 6 candidates and is located in the first span, USS2 has 24 candidates and is located in 2 spans, each span has 12 candidates; assuming M_per_span=16, M_per_slot=40, the candidate dropping of the span level is firstly performed according to the M_per_span, and then the granularity dropping of the search space is used as an example, then the USS2 in the first span is dropped, and the USS2 in the second span does not exceed the M_per_span threshold after being judged, and thus the dropping is not required. Next, the candidate dropping of the slot level is performed according to the M_per_slot, and no further drop is required because a sum of candidates of all search space does not exceed the M_per_slot. For another example, CSS0 has 4 candidates and is located in the first span, CSS1 has 4 candidates and is located in the first span, USS1 has 6 candidates and is located in the first span, USS2 has 48 candidates and is located in 4 spans, each span has 12 candidates; assuming M_per_span=16, M_per_slot=40, then the span level candidate dropping is firstly performed according to M_per_span, and the granularity dropping of search space is used as an example, then the USS2 within the first span is dropped, and the second span, the third span and the fourth span do not exceed the M_per_span threshold after being judged respectively, and the dropping is not required. Next, the candidate dropping of the slot level is performed according to the M_per_slot, and since a sum of candidates of all search space exceeds the M_per_slot, further candidate dropping is required, and the rule may be the method in the embodiment 2, or be the dropping of the candidate level described in conjunction with the embodiment 3. In an embodiment, that first span has CSS1, CSS2, USS1 and a sum of candidates is 1 4, the second span has USS2 and a sum of candidates is 1 2, the third span has USS2 and a sum of candidates is 1 2, the second span has USS2 and a sum of candidates is 1 2, that is, 50 candidates are out of M_per_slot at this time with the slot, for example, the method 2 in the embodiment 2 is selected and a last span is dropped; or in combination with the implementation 3, the third span dropping portion candidate is made to satisfy the M_per_slot threshold, i.e., the third span has 2 candidates remaining.

In an embodiment, the granularity at which the candidate set is determined to be dropped or reserved within the span may be selected as the entire search space, the entire search space within the span, the candidate set of search space. When the per slot exceeds the threshold, the dropping may be performed according to the span granularity, the candidate granularity, or the SS granularity. After the slot threshold exceeds the threshold, the candidate dropping may be executed again for each span to ensure that the per slot threshold is not exceeded and the processing complexity of the UEs is not increased.

Implementation 4.4

RRC configures the upper limit of each span, which ensures that a sum of upper limits of each configured span is not greater than a threshold of per slot, and performs the dropping at the granularity of span. An exemplary manner of performing a span level candidate dropping according to M_per_span is as shown in the implementation 4.3.

Through the candidate dropping determination method based on the span granularity described in this embodiment, it may be ensured that the CCE threshold of the terminal in each slot is not exceeded, the terminal processing complexity is not increased, and the method is applicable to an overbooking scene allowed within the slot or within the span. The configuration and scheduling flexibility is increased without exceeding UE capabilities.

Implementation 5

The terminal receives configuration information, and sends a same physical uplink shared channel (PUSCH)/transport block (TB) in one or more repetitions within a same slot or sends a same PUSCH/TB in one or more repetitions over multiple continuously available slots according to the configuration information. When a certain repeated transmission encounters a slot boundary or an uplink and downlink transmission direction switching point, the repeated transmission is divided into multiple actual repeated transmissions. The mentioned PUSCH or transport block (TB) refers to the information carried on the physical uplink shared channel. The configuration information is obtained in any one of following manners: RRC signaling or DCI signaling.

The multiple available slots mean that an uplink transmission is transmitted on continuous slots where a transmission direction of a subframe format is U (Up, uplink) or F (Flexible). An uplink and downlink transmission direction switching point means that the symbol transmission direction of the slot where the uplink transmission encounters is D (down, downlink) or F (flexible), that is, there is a collision with the uplink transmission direction, and then the uplink transmission is not transmitted on these symbols.

The embodiments of the present application is only explained by using the uplink transmission as an example, and it should be understood that the technical scheme may also be used for downlink and may also be used for other physical layer channels of 4G or 5G, such as a control channel, a random access channel and a data channel.

As shown in FIG. 9A, when a same transport block is repeatedly transmitted on continuous available slots, i.e., on slot n and slot n+1, when a PUSCH of a 2nd nominal repeated transmission (nominal repetition #2) is divided into a 2nd actual repetition transmission and a 3rd actual repetition transmission because of crossing the slot boundary and an uplink-downlink transmission direction transition point. Referring to a DMRS configuration table 4, the 1st repeated transmission is used as an example, a time domain position of the demodulation reference signal (DMRS) is located on a 1st symbol and a 4th symbol of a time domain length where the 1st repeated transmission is located. If the second nominal repeated transmission crosses the slot boundary, the DMRS is located at a time domain position corresponding to a 2nd actual repeated transmission, and a 3rd actual repeated transmission does not have the DMRS, so that the PUSCH of the 3rd repeated transmission cannot be decoded.

In order to address this problem, the present application proposes two methods.

Method 5.1: for crossing the slot boundary or when a certain nominal repeated transmission is divided into multiple actual repeated transmissions due to the uplink and downlink transmission direction transition point, configured DMRS information is determined according to the PUSCH of the actual repeated transmission. As shown in FIG. 9B, because a time domain length of a 2nd actual repeated transmission is 4 symbols, the DMRS is located on a 1st symbol of a time domain length where the 2nd actual repeated transmission is located by looking at Table 4 below. Similarly, a time domain length of a 3rd actual repeated transmission is 2 symbols, and the DMRS is located on a 1st symbol of a time domain length where the 3rd actual repeated transmission is located by looking up Table 4.

Figure 9C:
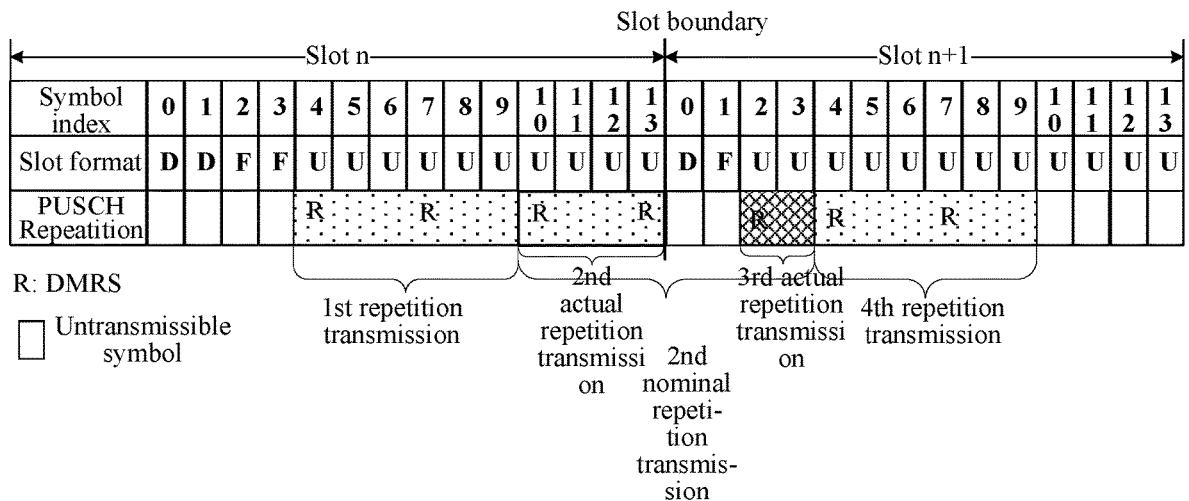

Method 5.2: for crossing the slot boundary or when a certain nominal repeated transmission is divided into multiple actual repeated transmissions due to a subframe format switching, configured DMRS information is determined according to a PUSCH of a nominal repeated transmission and a PUSCH of an actual repeated transmission. As shown in FIG. 9C, DMRSs determined according to the PUSCH of the nominal repeated transmission are all located in a time domain symbol in which an actual 2nd repeated transmission is located, and there is no DMRS on an actual 3rd repeated transmission, and the DMRS only needs to be reconfigured for the actual 3rd repeated transmission. It is obtained that by looking up Table 4 according to a time domain length of the actual 3rd repeated transmission, the DMRS is located on a 1st symbol of a time domain length where the 3rd actual repeated transmission is located. Finally, the DMRS of the actual 2nd repeated transmission is located on a 1st symbol and a 4th symbol of a time domain length where the 2nd actual repeated transmission is located, and the DMRS of the actual 3rd repeated transmission is located on a 1st symbol of a time domain length where the third actual repeated transmission is located.

That is, a DMRS time domain position determined according to the PUSCH of the nominal repeated transmission is wholly or partially present on a time domain position of a certain actual repeated transmission, and the DMRS is not reconfigured for this actual repeated transmission. If none of the DMRS time domain positions determined according to the PUSCH of the nominal repeated transmission exists on a time domain position of a certain actual repeated transmission, then the DMRS needs to be reconfigured for this actual repeated transmission.

In an embodiment, if the DMRS determined according to the PUSCH of the nominal repeated transmission is located on multiple divided actual repeated transmissions, and there is no case that certain actual repeated transmission has no DMRS, then DMRS configuration information is obtained according to the PUSCH of the nominal repeated transmission without re-obtaining the DMRS configuration. That is, if the DMRS determined according to a PUSCH of a 2nd nominal repeated transmission is located at time domain positions of the 2nd actual repeated transmission and the 3rd actual repeated transmission, then DMRS configuration information is obtained according to the PUSCH of the 2nd nominal repeated transmission without re-obtaining the DMRS configuration.

TABLE 4

DMRS positions $\bar{l}$ of PUSCHs for a single-layer DMRS and a non-enabled intra-slot hopping within a slot

| $l_d$ in sym- | DM-RS positions $\bar{l}$ | | | | | | | |
|---|---|---|---|---|---|---|---|---|
| | PUSCH mapping type A dmrs-AdditionalPosition | | | | PUSCH mapping type B dmrs-AdditionalPosition | | | |
| bols | 0 | 1 | 2 | 3 | 0 | 1 | 2 | 3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

In one embodiment of the present application, intra-slot represents within a slot; PUSCH mapping type A represents a type A of a PUSCH mapping; PUSCH mapping type B represents a type B of a PUSCH mapping; DM-RS positions represent positions of the DMRS; and dmrs-AdditionalPosition is an additional position of the DMRS.

In an embodiment, how a RV pattern of a PUSCH of these multiple repeated transmissions is determined after a nominal repeated transmission is divided into multiple actual repeated transmissions, there are two methods as follows.

Method 5.3: The redundancy version (RV) pattern of the PUSCH of multiple repeated transmissions is sequentially determined according to an actual number of repeated transmissions. As shown in FIG. 9B, the RV pattern configured by the base station is {0, 2, 3, 1}. For RV id=2 of a 2nd nominal repeated transmission, then the 2nd nominal repeated transmission is divided into the 2nd actual repeated transmission and the 3rd actual repeated transmission, then RV id=2 for the 2nd actual repeated transmission, RV id=3 for the 3rd actual repeated transmission, and RV id=1 for a 4th repeated transmission are determined in order of the RV pattern. The RV id for these 4 transmissions is then {0, 2, 3, 1} in turn.

Method 5.4: when a target code rate of a PUSCH of the 3rd actual repeated transmission is greater than a predefined target code rate A, or when a time domain duration of a PUSCH of the 3rd actual repeated transmission is less than a threshold B, then a RV id corresponding to the PUSCH of the 3rd actual repeated transmission is equal to 0. The RV pattern is then a 2nd actual repeated transmission RV id=2 and the 3rd actual repeated transmission RV id=0. Further, a 4th repeated transmission is determined according to a front 1 repeated transmission and may include two methods as follows.

Method A: it is determined according to a front 1 actual repeated transmission, that is, it is determined according to the order of RV id=0 for the 3rd actual repeated transmission, then RV id=2 for the 4th repeated transmission. Therefore, the RV ids for these 4 transmissions are {0, 2, 0, 2} in turn.

Method B: it is determined according to a front 1 nominal repeated transmission, that is, it is determined according to an order of RV id=2 for a 2nd nominal repeated transmission, then RV id=3 for a 4th repeated transmission. Therefore, the RV ids for these 4 transmissions are are {0, 2, 0, 3} in turn.

A predefined target code rate is a radio resource control (RRC) or downlink control information (DCI) notification, or is obtained according to a target code rate in a modulation and coding scheme (MCS) index; the threshold B is an integer greater than or equal to 1 and is also notified by the RRC or DCI.

Implementation 6

The terminal receives the configuration information, and sends a same physical uplink shared channel (PUSCH)/transport block (TB) in one or more repetitions within a same slot or sends a same PUSCH/TB in one or more repetitions over multiple continuously available slots according to the configuration information. How time domain resource information corresponding to multiple repeated transmissions is obtained needs to be further considered.

Method 6.1: it is obtained through a start length indicator value SLIVi of an i-th repeated transmission and/or a slot index where the i-th repeated transmission is located, or, a start length indicator value SLIVi of an i-th repeated transmission and/or a slot index from the beginning of a second repeated transmission.

A time domain start symbol (Si) and a time domain duration length (Li) of the i-th repetition may be obtained through the start length indicator value (SLIV), i is an integer, 0<i≤Q, and Q is an integer greater than or equal to 1.

The time domain resource information is configured by a high layer.

In an embodiment, the time domain resource information is jointly indicated by a high-layer configuration and high-layer control signaling. It may also be that the time domain resource information is jointly indicated by a high-layer configuration and dynamic control signaling.

In an embodiment, a slot index of a first repeated transmission is determined by a timing offset (slot offset $K^2$), where the timing refers to the time from downlink transmission of DCI to uplink transmission of PUSCH.

In an embodiment, the slot index for the i-th repeated transmission may be implicitly obtained. The high-layer configuration allocated by the time domain resource is shown in Table 5. In Table 5, Entry indicates an entry sequence number; PUSCH mapping type represents the PUSCH mapping type, $1^{st}$SLIV is a start length indicator value for a first repeated transmission, 2ndSLIV is a start length indicator value for a second repeated transmission, Slot index is a slot index, Type is a type, and Value is a value. If no slot index is configured for the i-th repeated transmission, it represents that it is within the same slot as a previous repeated transmission or previous few repeated transmissions. It may also be that if no slot index is configured for the i-th repeated transmission, it represents that it is within the same slot as the first repeated transmission. For example, when entry=0 in Table 2, for a 2nd repetition, slot index2 has no a configured numerical value, it represents that the 2nd repetition is within the same slot as the 1st repetition, i.e., both are in slot index #2.

For example, when entry=1, the slot index2 has a configured numerical value for the second repetition, it represents that the 2nd repetition and the 1st repetition are not in a same slot, and the slot index is obtained according to the configured numerical value. That is, the 1st repetition is in slot index #1 and the 2nd repetition is in slot index #3.

TABLE 5

| Entry | PUSCH mapping type | $1^{st}$SLIV | Slot index 1 ($K_2$) | $2^{nd}$SLIV | Slot index 2 |
|---|---|---|---|---|---|
| 0 | Type B | Value A1 | 2 | Value A2 | — |
| 1 | Type B | Value B1 | 1 | Value B2 | 3 |
| 2 | Type B | Value C1 | 3 | Value C2 | — |
| ... | ... | ... | ... | ... | ... |

It should be noted that a time domain resource allocation parameter of the high-layer configuration also contain other control domains, which will not be described here.

The present application provides a threshold value determination apparatus. The threshold value determination apparatus includes a first threshold value determination module. The first threshold value determination module is configured to determine a first threshold value according to a preset rule, where the first threshold value is a threshold value of each span in a span pattern.

In an implementation, the first threshold determination module is further configured to: determine a second threshold value, where the second threshold value is a threshold value corresponding to each combination in a combination set reported by a user equipment; and determine the first threshold value according to the second threshold value.

In an implementation, the first threshold determination module is further configured to determining a second threshold value corresponding to the capability level of the user equipment according to a capability level of the user equipment.

In an implementation, the first threshold determination module is further configured to: determine a maximum value of a number of spans which may be determined by the combination according to a combination of the combination set; calculate an average threshold value of each span according to the maximum value of the number of the spans and a slot threshold value; and determine a second threshold value corresponding to the combination according to the average threshold value of the each span.

In an implementation, a first threshold value corresponding to a span in which a search space or a monitoring opportunity for front L symbols within a slot is located is greater than a first threshold value corresponding to a remaining span, and L is a positive integer.

In an implementation, the first threshold determination module is further configured to determine the first threshold value according to a total threshold value within a slot and a number of spans within a slot.

In an implementation, the first threshold value determination module is further configured to determine the first threshold value according to a total threshold value within a slot and a number of spans within a slot, where a first threshold value of a span in which a search space or a monitoring opportunity for front L symbols within the slot is located is determined in following manners: a third threshold value is determined according to the total threshold value within the slot and the number of the spans within the slot, where the third threshold value is a maximum threshold value obtained by each span in a case where the total threshold value within the slot is averagely distributed to the each span; and a remaining number within the slot is distributed to a threshold value of the span in which the search space or the monitoring opportunity for the front L symbols within the slot is located, to obtain the first threshold value, where the remaining number is a number remaining after a product of the total threshold value minus the third threshold value and the number of the spans within the slot, and L is a positive integer.

In an implementation, a first threshold value of a span in which a search space or a monitoring opportunity for front L symbols within the slot is located is determined in following manners: the first threshold value corresponding to the span in which the search space or the monitoring opportunity for the front L symbols within the slot is located is equal to a sum of a slot threshold value and a second threshold value, and L is a positive integer.

In an implementation, a first threshold value of a span in which a search space or a monitoring opportunity for front L symbols within the slot is located is determined in following manners: the first threshold value corresponding to the span in which the search space or the monitoring opportunity for the front L symbols within the slot is located is equal to a sum of a slot threshold value and a third threshold value, and L is a positive integer.

In an implementation, that first threshold value determination module is further configured to: add a first offset value on the basis of a second threshold value according to a length of a span to obtain the first threshold value.

In an implementation, the first threshold value determination module is further configured to add a second offset value to a second threshold value to obtain the first threshold value when an actual number of spans within a slot is less than a maximum number of spans.

In an implementation, the preset rule includes at least one of: if a combination set includes the combination (7, 3) and an actual span pattern is derived from the combination (7, 3), then the first threshold value is determined by adopting a second threshold value corresponding to the combination (7, 3); if the combination set includes the combination (4, 3) and the actual span pattern is derived from the combination (4, 3), then the first threshold value is determined by adopting a second threshold value corresponding to the combination (4, 3); if the actual span pattern only has 1 span, then the first threshold value is determined by adopting a slot threshold value; or if the actual span pattern is other situations except the situation described above, then the first threshold value is determined by adopting a second threshold value corresponding to a combination (2, 2).

In an implementation, the first threshold determination module is further configured to: determine the first threshold value by adopting a second threshold value corresponding to the combination (7, 3) if an actual span pattern of a partial span in a slot is derived from the combination (7, 3); and determine the first threshold value by adopting a second threshold value corresponding to the combination (2, 2) if the actual span pattern of the partial span in the slot is derived from the combination (2, 2).

In an implementation, the first threshold value determination module is further configured to configure the first threshold value by high-layer signaling.

In an implementation, that first threshold value determination module is further configured to independently configure the first threshold value of each span, or configure a same first threshold value for all spans.

In an implementation, the offset value is an integer and is at least one between −N and N, and N is a positive integer.

In an implementation, that threshold value is a blind detection number threshold or a non-overlapping control resource element number threshold.

The present application further provides a resource determination apparatus. The resource determination apparatus includes a resource determination module. The resource determination module is configured to determine a resource that should be reversed or a resource that should be dropped by utilizing a threshold value of a span; where the resource includes a candidate set, or all candidate sets of a search space within a span, or candidate sets of all search spaces within the span.

Functions of each module in each apparatus according to the embodiments of the present application may be referred to the corresponding description in the above method embodiments, which will not be described here.

In an implementation, the resource determination module is further configured to: determine a candidate set of a span of a critical value index and a candidate se of all spans after the span of the critical value index as a candidate set that should be dropped according to a sequence of all spans within a slot if a sum of threshold values of all spans within a same slot is greater than a slot threshold value; or determine a candidate set of all spans before the span of the critical value index as a candidate set that should be reserved; make a sum of accumulated threshold values from a span ranked first within the slot to the span of the critical value index to be exceeded the slot threshold value for the first time.

In an implementation, if a number of resources within one span is greater than the threshold value of the span, part of resources exceeding the threshold value of the span is determined as the resource that should be dropped; or part of candidate sets not exceeding the threshold value of the span are determined as the reserved resource.

In an implementation, when the resource is the candidate set, a method of dropping or reserving includes one of: a rank of an aggregation level of part of candidate sets exceeding the threshold value of the span is greater than a rank of an aggregation level of the other part of candidate sets not exceeding the threshold value of the span; a rank of an aggregation level of the part of candidate sets exceeding the threshold value of the span is less than a rank of an aggregation level of the other part of candidate sets not exceeding the threshold value of the span; or a certain number of candidate sets are sequentially reserved by each aggregation level until the certain number of candidate set exceeds the threshold value of the span, or a certain number of candidate sets are sequentially dropped by each aggregation level until the remaining number of candidate set exceeds the threshold value of the span where the certain number is a preset or configured same number or a numerical pattern corresponding to each aggregation level.

In an implementation, before the resource that should be reserved or the resource that should be dropped is determined by utilizing the threshold value of the span, it further includes: if a sum of threshold values of all spans within a same slot is greater than a slot threshold value, then an average threshold value of all spans within a slot is calculated according to the slot threshold value; and a threshold value of each span within the slot is re-determined according to the average threshold value of the all spans within the slot.

In an implementation, before the resource that should be reserved or the resource that should be dropped is determined by utilizing the threshold value of the span, it further includes: if a sum of threshold values of all spans in one slot is greater than a slot threshold value, then threshold values of each span within a slot are re-determined through a high-layer signaling configuration, so that a sum of the re-determined threshold values of the each span is not greater than the slot threshold value.

In an implementation, before the resource that should be reserved or the resource that should be dropped is determined by utilizing the threshold value of the span, it further includes: a threshold value of at least one span is re-determined as a sum of a slot threshold value and the threshold value of the span.

In an implementation, the at least one span is a span in the slot or a span in the slot including one of front L symbols; and L is a positive integer.

In an implementation, before the resource that should be reversed or the resource that should be dropped is determined by utilizing the threshold value of the span, it further includes: if the threshold value of the span is different from a threshold value configured to each span by high-layer signaling, then the threshold value of the span is re-determined as one with a smaller value between a threshold value of an original span and the threshold value configured to the each span by the high-layer signaling.

In an implementation, the step in which the resource that should be reserved or the resource that should be dropped is determined by utilizing the threshold value of the span includes: the resource that should be reserved or the resource that should be dropped is determined according to the threshold value of the span firstly, and then the resource that should be reserved or the resource that should be dropped is determined according to a slot threshold value.

Or, the step in which the resource that should be reserved or the resource that should be dropped is determined by utilizing the threshold value of the span includes: the resource that should be reserved or the resource that should be dropped is determined according to the threshold value of the span firstly, and then the resource that should be reserved or the resource that should be dropped is determined according to the slot threshold value.

In an implementation, the step in which the resource that should be reserved or the resource that should be dropped is determined according to the threshold value of the span firstly, and then the resource that should be reserved or the resource that should be dropped is determined according to the slot threshold value includes: the resource that should be reserved or the resource that should be dropped is determined according to the threshold value of the span; if the reserved resource exceed the slot threshold value, then a candidate set of all spans after a span of a critical value index is determined as a dropped candidate set according to a sequence of all spans within a slot, and part of candidate sets of the span of the critical value index is determined as the dropped candidate set; or a candidate set of all spans before the span of the critical value index is determined as a reserved candidate set, and part of candidate sets of the span of the critical value index id determined as the reserved candidate set; and a sum of accumulated threshold values from a span ranked first within the slot to the span of the critical value index exceeds the slot threshold value for the first time.

In an implementation, the step in which when the resource includes all candidate sets of the search space within a current span, the reserved resource or the dropped resource is determined by utilizing the threshold value of the span includes: if a slot threshold value does not exist, then determining, according to a sequence of the search space within the span, a candidate set of a search space of a critical value index and a candidate set of all search spaces after the critical value index are determined as a candidate set that should be dropped; or a candidate set of all search spaces before the search space of the critical value index is determined as a candidate set that should be reversed; and a sum of accumulated threshold values from a search space ranked first within the span to the search space of the critical value index exceeds the threshold value of the span for the first time.

In an implementation, the candidate set is a candidate set of a channel blind detection (BD) of a PDCCH upon corresponding to a blind detection (BD) threshold, or a candidate set of a non-overlapping CCE for channel estimation.

In an implementation, the threshold value of the span is a threshold value determined according to the threshold value determination method provided in the embodiments of the present application.

Figure 10:
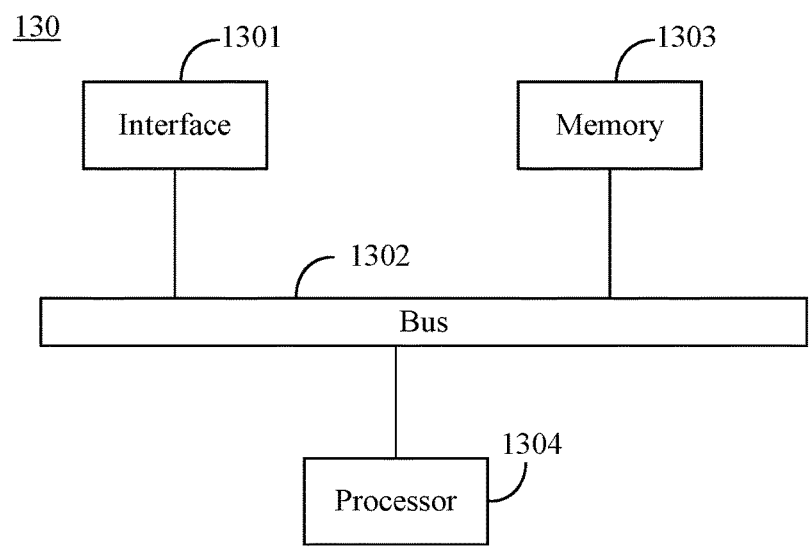
FIG. 10 is a schematic structural diagram of a terminal provided in an embodiment of the present application.

FIG. 10 is a schematic structural diagram of a terminal provided in an embodiment of the present application. As shown in FIG. 10, a terminal 130 provided in the embodiment of the present application includes a memory 1303 and processor 1304. The terminal 130 may further include an interface 1301 and a bus 1302. The interface 1301, the memory 1303 and the processor 1304 are connected via the bus 1302. The memory 1303 is used for storing instructions. The processor 1304 is configured to read the instructions to perform the technical solutions of the above-described method embodiments applied to the terminal, the implementation principles and technical effects of which are similar, which will not be described here.

Figure 11:
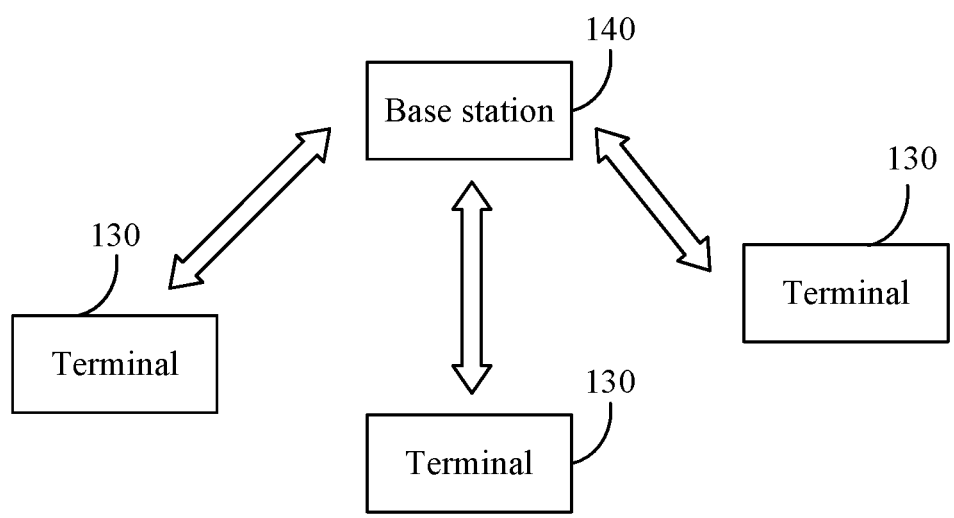
FIG. 11 is a schematic structural diagram of a communication system provided in an embodiment of the present application.

FIG. 11 is a schematic structural diagram of a communication system provided in an embodiment of the present application. As shown in FIG. 11, the system includes the terminal 130 in the above-described embodiments and the base station 140 in the above-described embodiments. The communication system of the embodiments of the present application includes but is not limited to a long-term evolution (LTE) system, an LTE frequency division duplex (FDD) system, an LTE time division duplex (TDD) system, a universal mobile telecommunications system (UMTS), or a 5G system.

The above description is merely an exemplary embodiment of the present application, and is not intended to limit the scope of protection of the present application.

In general, various embodiments of the present application may be implemented in hardware or special purpose circuits, software, logic or any combination thereof. For example, some aspects may be implemented in hardware, while other aspects may be implemented in firmware or software which may be executed by a controller, a microprocessor or other computing apparatuses, although the present application is not limited thereto.

Embodiments of the present application may be implemented through a data processor of a mobile apparatus executing computer program instructions, for example in a processor entity, or through hardware, or through a combination of software and hardware. The computer program instructions may be assembler instructions, instruction set architecture (ISA) instructions, machine instructions, machine-related instructions, microcode, firmware instructions, state setting data, or source or object codes written in any combination of one or more programming languages.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology. The memory in the embodiments of the present application may be either a volatile memory or a nonvolatile memory, or may include both a volatile memory and a nonvolatile memory. The nonvolatile memory may be a read-only memory (ROM), a programmable ROM (PROM), an Erasable PROM (EPROM), an Electrically EPROM (EEPROM), or a flash Memory. The volatile memory may be a random access memory (RAM) which serves as an external cache. The RAM may include various forms such as a static random access memory (Static RAM, SRAM), a dynamic RAM (DRAM), a synchronous DRAM (SDRAM), a double data rate SDRAM (DDR SDRAM), an Enhanced SDRAM (ESDRAM), a synchlink DRAM (SLDRAM), and a Direct Rambus RAM (DR RAM). The memory of the system and method described in the present application includes, but is not limited to, these and any other suitable types of memory.

The processor of the embodiments of the present application may be any type suitable for a local technical environment, such as, but not limited to, a general purpose computer, a dedicated computer, a microprocessor, a digital signal processor (DSP), an application specific integrated circuit (ASIC), a field programmable logic device (Field Programmable Gate Array, FGPA) or other programmable logic device, a discrete gate or transistor logic device, a discrete hardware assembly, or a processor based on a multi-core processor architecture. The generic processor may be a microprocessor or may be any conventional processor or the like. The processor described above may implement or perform the steps of the methods disclosed in the embodiments of the present application. A software module may be located in a storage medium that is well-established in the art, such as a random access memory, a flash memory, a read-only memory, a programmable read-only memory, or an electrically erasable programmable memory, a register, or the like. The storage medium is located in the memory, and the processor reads information in the memory and completes the steps of the above methods in combination with the hardware thereof.

What is claimed is:

1. A threshold value determination method, comprising:
   determining, according to a preset rule, a first threshold value, wherein the first threshold value is a threshold value of each span in a span pattern;
   wherein determining the first threshold value according to the preset rule comprises:
   in response to the span pattern being derived from any one of a plurality of combinations in a combination set reported by a user equipment (UE), determining a plurality of second threshold values corresponding to the plurality of combinations and determining the first threshold value according to a maximum one of the plurality of second threshold values, wherein the plurality of second threshold values have a one-to-one correspondence with the plurality of combinations;
   wherein the second threshold value corresponding to each combination is a maximum number of non-overlapping control channel elements (CCEs) per span for the combination.

2. The method of claim 1, wherein determining the plurality of second threshold values corresponding to the plurality of combinations comprises:
   determining, according to a capability level of the user equipment, the plurality of second threshold values corresponding to the capability level of the user equipment.

3. The method of claim 1, wherein determining, according to the preset rule, the first threshold value comprises:
   in response to the span pattern of partial spans in a slot being derived from a combination (7, 3), adopting a second threshold value corresponding to the combination (7, 3) to determine the first threshold value; and
   in response to the span pattern of partial spans in a slot being derived from a combination (2, 2), adopting a second threshold value corresponding to the combination (2, 2) to determine the first threshold value.

4. The method of claim 1, wherein the first threshold value or the second threshold value is either a blind detection number threshold or a non-overlapping control resource unit number threshold.

5. The method of claim 1, wherein the preset rule further comprises at least one of:
   in response to all combinations in the combination set comprising combinations (7, 3), (4,3) and (2,2) and the span pattern being derived from a combination (7, 3), (4, 3), or (2, 2), adopting a second threshold value corresponding to the combination (7, 3) to determine the first threshold value;
   in response to all combinations in the combination set comprising the combination (7, 3), (4, 3) and (2, 2) and the span pattern being derived from a combination (4, 3) or (2, 2), adopting a second threshold value corresponding to the combination (4, 3) to determine the first threshold value.

6. A network device, comprising a processor and a memory, wherein the memory is configured to store instructions, and the processor is configured to read the instructions to perform:
   determining, according to a preset rule, a first threshold value, wherein the first threshold value is a threshold value of each span in a span pattern;
   wherein determining the first threshold value according to the preset rule comprises:
   in response to the span pattern being derived from any one of a plurality of combinations in a combination set reported by a user equipment (UE), determining a plurality of second threshold values corresponding to the plurality of combinations and determining the first threshold value according to a maximum one of the plurality of second threshold values, wherein the plurality of second threshold values have a one-to-one correspondence with the plurality of combinations;
   wherein the second threshold value corresponding to each combination is a maximum number of non-overlapping control channel elements (CCEs) per span for the combination.

7. The network device of claim 6, wherein the processor is configured to determine the plurality of second threshold values corresponding to the plurality of combinations by:
   determining, according to a capability level of the user equipment, a plurality of second threshold value corresponding to the capability level of the user equipment.

8. The network device of claim 6, wherein the processor is configured to determine, according to the preset rule, the first threshold value by:
   in response to the span pattern of partial spans in a slot being derived from a combination (7, 3), adopting a second threshold value corresponding to the combination (7, 3) to determine the first threshold value; and
   in response to the span pattern of the partial spans in the slot being derived from a combination (2, 2), adopting a second threshold value corresponding to the combination (2, 2) to determine the first threshold value.

9. The network device of claim 6, wherein the first threshold value or the second threshold value is either a blind detection number threshold or a non-overlapping control resource unit number threshold.

10. The network device of claim 6, wherein the preset rule further comprises at least one of:
in response to all combinations in the combination set comprising combinations (7, 3), (4,3) and (2,2) and the span pattern being derived from a combination (7, 3), (4, 3), or (2, 2), adopting a second threshold value corresponding to the combination (7, 3) to determine the first threshold value;
in response to all combinations in the combination set comprising the combination (7, 3), (4, 3) and (2, 2) and the span pattern being derived from a combination (4, 3) or (2, 2), adopting a second threshold value corresponding to the combination (4, 3) to determine the first threshold value.

11. A non-transitory computer-readable storage medium, storing a computer program, wherein the computer program, when executed by a processor, implements:
determining, according to a preset rule, a first threshold value, wherein the first threshold value is a threshold value of each span in a span pattern;
wherein determining the first threshold value according to the preset rule comprises:
in response to the span pattern being derived from any one of a plurality of combinations in a combination set reported by a user equipment (UE), determining a plurality of second threshold values corresponding to the plurality of combinations and determining the first threshold value according to a maximum one of the plurality of second threshold values, wherein the plurality of second threshold values have a one-to-one correspondence with the plurality of combinations;
wherein the second threshold value corresponding to each combination is a maximum number of non-overlapping control channel elements (CCEs) per span for the combination.

12. The non-transitory computer-readable storage medium of claim 11, wherein the computer program is configured to implement the plurality of second threshold values corresponding to the plurality of combinations by:
determining, according to a capability level of the user equipment, a plurality of second threshold value corresponding to the capability level of the user equipment.

13. The non-transitory computer-readable storage medium of claim 11, wherein the computer program is configured to implement, according to the preset rule, the first threshold value by:
in response to the span pattern of partial spans in a slot being derived from a combination (7, 3), adopting a second threshold value corresponding to the combination (7, 3) to determine the first threshold value; and
in response to the span pattern of the partial spans in the slot being derived from a combination (2, 2), adopting a second threshold value corresponding to the combination (2, 2) to determine the first threshold value.

14. The non-transitory computer-readable storage medium of claim 11, wherein the first threshold value or the second threshold value is either a blind detection number threshold or a non-overlapping control resource unit number threshold.

15. The non-transitory computer-readable storage medium of claim 11, wherein the preset rule further comprises at least one of:
in response to all combinations in the combination set comprising combinations (7, 3), (4,3) and (2,2) and the span pattern being derived from a combination (7, 3), (4, 3), or (2, 2), adopting a second threshold value corresponding to the combination (7, 3) to determine the first threshold value;
in response to all combinations in the combination set comprising the combination (7, 3), (4, 3) and (2, 2) and the span pattern being derived from a combination (4, 3) or (2, 2), adopting a second threshold value corresponding to the combination (4, 3) to determine the first threshold value.

* * * * *